United States Patent [19]

Pouget et al.

[11] Patent Number: 4,705,586

[45] Date of Patent: Nov. 10, 1987

[54] METHOD OF WORKING LEATHER FOR THE UPPERS OF LEATHER FOOTWEAR

[75] Inventors: Jacques Pouget, Gradignan; Vincent Lipovac, Premery; Yves de Mauduit, La Charite sur Loire, all of France

[73] Assignee: Borden, Inc., Columbus, Ohio

[21] Appl. No.: 754,443

[22] PCT Filed: Nov. 14, 1984

[86] PCT No.: PCT/FR84/00261

§ 371 Date: Jul. 12, 1985

§ 102(e) Date: Jul. 12, 1985

[87] PCT Pub. No.: WO85/02095

PCT Pub. Date: May 23, 1985

[30] Foreign Application Priority Data

Nov. 16, 1983 [FR] France ........ 83 18232

Nov. 9, 1984 [FR] France ........ 84 17239

[51] Int. Cl.[4] ........ B32B 31/24

[52] U.S. Cl. ........ 156/242; 156/245; 156/272.2; 264/244; 8/94.19 R; 8/94.20; 8/94.22; 8/94.23; 8/150.5; 12/142 R; 12/142 T; 427/389; 427/412; 428/473; 428/904

[58] Field of Search ........ 156/242, 245, 272.2, 156/274.4; 8/94.19 R, 94.20, 94.22, 94.23, 150.5; 427/389, 412; 428/473, 904; 264/244; 12/142 R, 142 F, 142 K, 142 T, 146 C, 146 CK

[56] References Cited

U.S. PATENT DOCUMENTS 2,828,224 3/1958 Alps et al. ........ 427/389
3,178,310 4/1965 Berger et al. ........ 427/389
3,245,827 4/1966 Weber ........ 428/473
3,298,856 1/1967 Harding ........ 428/473
3,761,304 9/1973 Hansson ........ 427/389
4,256,809 3/1981 Larsson et al. ........ 427/389

*Primary Examiner*—Caleb Weston
*Attorney, Agent, or Firm*—Robbins & Laramie

[57] ABSTRACT

A method of working leather, in which a deposit of material adhering to the leather is made on the surface of the leather to enable a leather footwear upper treated in this way to adhere to a sole without being carded or sanded, either by direct injection of sole-constituting material, or else by bonding on or by gluing on a prefabricated sole, and/or to enable the leather to be worked by a high frequency current.

31 Claims, No Drawings

METHOD OF WORKING LEATHER FOR THE UPPERS OF LEATHER FOOTWEAR

The invention relates to working leather, more particularly for fabricating footwear uppers.

A very great deal of footwear is manufactured by assembling an upper to a sole. To perform this assembly, the upper is placed on a last which has a face adjacent to the margin of the upper which constitutes one wall of a mold cavity into which plastics material is injected to constitute the sole, which is thus fixed to the margin of the upper during the molding operation. Alternatively, a layer of glue is applied to the margin of the upper while on the last, and a sole of leather or plastic is applied thereto and is thus fixed to the upper by gluing or by bonding.

When the uppers are made of leather, the shoe manufacturer receives hides from a tanner and cuts up the hides into uppers. However, before delivering hides, the tanner treats them by applying a layer of finish as requested by the manufacturer to give the leather a final appearance desired for the upper from the point of view of color and/or surface state.

Having observed that, all too often the sole adheres inadequately to an upper coming from a leather treated in this manner, and having determined that this fault stems from poor bonding between the layer of finish and the hide, shoe manufacturers have taken the habit, prior to assembly, of removing the layer of finish from the margin of the upper where it is intended to come into contact with the sole. This is usually done by sanding or by carding.

However, it very frequently happens that the carded or sanded margin does not coincide with the portion of the upper which will subsequently come into contact with the sole. If the sanded or carded margin is too wide, the finished shoe will have a more or less regular finish-free border. This gap needs to be retouched by hand, which is expensive. In contrast, if the margin is too narrow the sole will have inadequate adhesion to the non-sanded or non-carded border, and all too often the shoes will have to be rejected. In all cases, adhesion between the upper and the sole is limited to the portion of the surface which has been sanded or carded.

The invention provides a method which goes against previous proposals of removing material applied to the hide prior to fixing to the sole: instead a deposit is applied thereto suitable for obtaining the desired final result, e.g. ensuring that the leather finished in this manner adheres to a sole at least as well as does leather which has had all such products removed by sanding or carding.

The method is particularly of interest for manufacturing sports shoes such as jogging or training shoes in which the leather constituting the uppers must be pale or even white in color, thus making irregularities due to sanding or carding unacceptable, particularly when the sole includes a peripheral flange for partially covering the upper.

According to the present invention, a deposit of material adhering to the leather is formed on the surface of the leather to enable a leather footwear upper treated in this way to adhere to a sole without being carded or sanded, either by direct injection of sole-constituting material, or else by bonding on or by gluing on a prefabricated sole.

The footwear manufacturer thus has no preliminary operations to perform on the leather as delivered by the tanner after being subjected to the surface treatment of the invention. Furthermore, the surface treatment does not imply increased tanning costs, since it replaces the finishing operations that were previously necessary to provide leather with the surface appearance and mechanical properties desired by the footwear manufacturer.

The sanding or carding step previously required when fitting soles is thus avoided, as are manufacturing rejects and also the need for retouching, while retaining versatility concerning the designs of footwear which can be manufactured.

According to a particular mode of implementing the invention, the deposit is formed on the surface of the leather by a plurality of superposed layers, each of which is chosen to adhere to the underlying layer.

By way of example, in a first step of the method, the leather receives an undercoat which is advantageously constituted by a polyurethane emulsion containing pigments and a reticulating agent. The undercoat should be sufficiently dilute in form to ensure that it thoroughly impregnates the dermis, eg. like conventionally used arcylic undercoats.

Prior to the application of the undercoat, the method provides for synthetic retanning of the hide by means of the chemicals conventionally used by tanners such as anionic and sulfonated condensed phenol derivatives, phosphoric and polyglycol esters, etc. to the exclusion of any animal or vegetable products. The bonding between the undercoat and the fibers of the leather is then not only mechanical, but adhesion is considerably increased by chemical bonds of the hydrogen type between the polyurethane binder of the undercoat and some of the functional groups of the retanning products.

The method also provides for a highly advantageous step of rubbing down the grain of the hide before applying the undercoat.

In a second step of the method, the hide receives an intermediate coat or "inter" of similar composition to the undercoat but at higher concentration both of emulsion and of pigment, with a reticulating agent being also added to the emulsion.

The hide thus treated is subjected to a first hot glaze to ensure complete chemical reticulation of both coats applied thereto together with full adhesion and cohesion of the leather-undercoat-inter assembly, while at the same time preparing the desired surface appearance of the footwear upper.

A surface finishing coat is then applied, which coat is constituted by a dissolution of a polyurethane resin, a pigment, and a reticulating agent in a solvent. The finishing coat may be glossy or glazed in appearance. It adheres well to the hide by virtue of the previous treatment thereof.

Finally, the leather is given a second hot glaze followed by a graining operation to give the leather its final surface appearance.

The leather is then ready for delivery by the tanner to the footwear manufacturer.

EXAMPLES

There follow examples of leather treatment enabling footwear to be manufactured by fixing a sole without any other preparatory treatment to the leather.

Undercoat example:

The undercoat has the following composition (by weight):

| | |
|---|---|
| Polyurethane emulsion | 30 |
| Concentrated pigment | 10 |
| Water | 20 |
| Ethylglycol | 30 |
| Butylglycol | 10 |
| Phosphac | 2 |
| Reticulating agent | 0.5 |
| | 102.5 |

solids content about 21.5%.

4 to 6 grams (g) of solids are applied per square foot of leather.

"Inter" coat example:

The intermediate coat has the following composition (by weight):

| | |
|---|---|
| Polyurethane emulsion | 50 |
| Concentrated pigment | 30 |
| Water | 20 |
| Reticulating agent | 0.5 |
| | 100.5 |

solids content about 54.7%.

9 to 12 g of solids are applied per square foot of leather which has already received the undercoat.

Surface finish example:

The surface finish has the following composition (by weight):

| | |
|---|---|
| Polyurethane solution | 15 |
| Pigment | 6 |
| Cyclohexanone | 15 |
| Methylethylcetone | 64 |
| Reticulating agent | 1 |
| | 101 |

solids content about 13.5%.

2 to 3 g of solids are applied per square foot of leather which has already received the under- and intermediate coats.

Hot glazing:

is performed using conventional tannery equipment (hot presses) at 100° C. for 2 to 4 seconds.

The above examples are not limiting in character.

It is further known that, for reasons of economy it is common practice to replace natural leather in the fabrication of footwear uppers by synthetic material or by composite materials in which at least the outside portion is synthetic. It is then often desired to give the outside of the upper the appearance of natural leather.

In particular, the so-called "high-frequency" method provides footwear uppers having the outward appearance of leather from sheet materials in which at least the outside face is not made of leather, for example, cloth coated with polyvinyl chloride (PVC) or plastisols lined with cloth or with preglued split leather.

For example, to this end, a leather upper may be disassembled from a shoe and spread flat to act as a master for making an imprint in a reticulateable silicone. A sheet of the above-mentioned type which is to be given the appearance of natural leather is then placed in the resulting mold and a high frequency electric current is made to pass through the sheet, thereby softening or melting it so that its surface takes up the irregularities of the mold wall and thus acquires the surface configuration of the natural leather upper from which the mold was made.

The use of high frequency current can also heat bond the outside face of the sheet to ornaments or reinforcements made of material having suitable dielectric properties.

These ornaments or reinforcements are usually placed in corresponding housings in the mold, which housings are advantageously made from imprints of ornaments or reinforcements present on the original natural leather upper used as a master.

It is conventional to modify the surface configuration of the sheet and to perform the bonding in a single operation.

To perform this method, the mold containing the sheet to be treated, together with any ornaments or reinforcements, is placed between two electrically conductive plates and a high frequency current is passed between the plates through the mold and its contents.

This is a very cheap method of fabricating footwear uppers having the appearance of leather and fitted with ornaments or reinforcements if required.

In spite of the efforts made in this field, it has not been possible up to the present to modify the surface configuration of leather by the use of a high frequency current, where the term "leather" is used in the present specification to denote natural leather only, in contrast to any kind of synthetic material.

Likewise, it has not been possible up to the present to fix ornaments and/or reinforcements having a discontinuous surface to leather footwear uppers by using a high frequency current.

Ther term "upper" is used herein to designate both a portion of finished footwear, and also a cut out portion of sheet intended to constitute said portion of finished footwear after shaping.

Preferred implementations of the invention enable the high frequency method to be used on leather footwear uppers, while retaining the economic advantages brought thereby in its known application to synthetic uppers.

It has been observed that by using a deposit formed on the surface of the leather it is possible, surprisingly, both to obtain as good a bond between the leather and a sole as can be obtained by partially eliminating the grain (epidermis) of the leather, but also to obtain a modification of the surface configuration of such a deposit by the high frequency method together with its direct adhesion to ornaments or to reinforcements, without requiring mechanical processing or the use of adhesives.

The ornaments and/or reinforcements may be made of synthetic material having suitable dielectric permeability, e.g. plastisols, polyvinyl chloride and vinyl copolymenrs, as in the prior art.

In addition, the invention can be used with ornaments and/or reinforcements made of leather by applying the abovedefined surface treatment to their faces turned towards the body of the future footwear upper, whether the body is made of treated leather or of a non-leather sheet material.

It is also possible to provide raised decoration on the outer faces of the ornaments and/or reinforcements, i.e. on their faces opposite to their faces that come into contact with the body of the upper, by providing irregularities in the surface of the mold recess.

When the ornaments and/or reinforcements are made of leather, the face receiving the decoration should also be subjected to the above-defined surface treatment. Such decoration could, for example, be imitation stitching obtained by taking the mold imprint from a master having ornaments and/or reinforcements fixed thereto by stitching.

When implementing the high frequency method, given that the resistivity of leather is a function of tanning conditions and of the degree of humidity, and may be very high, the resistivity of the leather may be compensated by reducing the resistivity of the mold, e.g. by incorporating conductive particles such as metal powder particles in the material from which the mold is made.

It is also important to keep the mold under pressure while the current is passing and during cooling.

A footwear upper that has been subject to the surface treatment of the invention and, where appropriate, has been worked by the high frequency method, may be directly fixed to a sole, either by mounting it on a last which forms part of a mold for receiving a sole made of injected PU, TR, or PVC, etc. in the usual manner, or by mounting it on a last and gluing or bonding a prefabricated sole thereto. In either case, the footwear manufacturer has no need to treat the leather, and in particular no need to sand it or card it, and the sole adheres over its entire contact surface with the leather if the sole is injected or over the entire surface which received glue, if the sole is glued or bonded.

Experience has shown that the adhesion of a sole to an upper made of such leather which has merely been cut out without any sanding or carding, is at least as good as the adhesion which used to be obtained after sanding or carding.

Footwear manufacture is thus simplified. Rejects and retouching are avoided.

The overall cost price is reduced.

The invention contemplates possible deviations from the surface treatment described in the examples.

In particular, it is possible, and even advantageous when the leather is subsequently to be worked by the high frequency method, to omit hot glazing operations and/or to increase the quantity of the material used to constitute at least one of the successive layers, e.g. the second or "inter" layer, so as to obtain higher relief on the footwear upper.

The invention also provides for the treatment of the outside face of the leather to comprise the application of only two layers rather than three as described above, in which case the undercoat or the "inter" coat is omitted. Such treatment may be applied whether or not the treated leather is intended for high frequency working.

The invention also provides for surface treatment of leather in which a single layer of undercoat, in this case relatively thick, is applied to the leather to enable the leather to be worked in a manner analogous to that used for leather on which three successive layers have been applied as described above.

The invention also provides a footwear upper which is fabricated using the method of working defined above, and also footwear including such an upper.

The invention is applicable to the various kinds of leather used in the footwear industry including grain split and flesh split. It is particularly applicable to fabricating sports shoes.

The invention is also applicable to fields other than footwear uppers, in particular for the use of leather in clothing, furnishing, bagging, and saddlery. The invention also provides in a general manner applying a high frequency treatment for assembling leather parts after they have been subjected to a suitable surface treatment, or for bonding leather parts to themselves, after folding.

What is claimed is:

1. A method of working leather, characterized by first subjecting the leather to a surface treatment comprising applying on the leather a plurality of superposed layers of which the first one adheres to the leather and the other layer or each other layer adheres to an underlying layer, and then applying to the so-treated leather a working treatment by a high frequency current.

2. A method according to claim 1, characterized in that the working comprises forming surface irregularities.

3. A method according to claim 2 wherein the surface configuration of the leather is modified by surface softening or melting by means of the high frequency current.

4. A method according to claim 1, characterized in that the working comprises applying ornaments or reinforcements by bonding.

5. A method according to claim 4, wherein the ornaments and/or reinforcements are made of leather which has also been subjected to said surface treatment.

6. A method according to claim 4, wherein the ornaments and/or reinforcements are made of synthetic material.

7. A method according to claim 6, wherein said synthetic material is chosen from plastisols, polyvinyl chloride, and vinyl copolymers.

8. A method according to claim 1, characterized in that the leather is prepared for use as a footwear upper.

9. A method according to claim 1, wherein the working comprises applying the leather as ornaments and/or reinforcements to a synthetic material by bonding.

10. A method according to claim 9, characterized in that the synthetic material is prepared for use as a footwear upper.

11. A method according to claim 1, characterized in that the high frequency current is applied in a mold the wall of which has irregularities that are complementary to the surface configuration to be obtained and/or bears ornaments and/or reinforcements to be bonded.

12. A method according to claim 11, characterized in that the mold is made by taking an imprint from a master leather upper of footwear to be reproduced after spreading said master upper out flat.

13. A method according to claim 11, characterized in that the mold is made of silicone elastomer.

14. A method according to claim 11, characterized in that electrically conductive particles are incorporated in the material of the mold.

15. A method according to claim 11, characterized in that the mold is kept under pressure while the current is passing and during cooling.

16. A method according to claim 11, wherein the wall of the mold has irregularities facing the ornaments and/or reinforcements so as to provide raised decoration thereon.

17. A method according to claim 16, wherein the ornaments and/or reinforcements are made of leather and the faces thereof in contact with the mold have been subjected to said surface treatment.

18. A method according to claim 1, characterized in that the surface treatment comprises no hot glazing.

19. A method according to claim 1, characterized in that a single relatively thick layer of undercoat is applied to the leather.

20. A method according to claim 1, wherein said surface treatment comprises the steps of:

(a) applying to the leather an undercoat in the form of a diluted aqueous emulsion of polyurethane, which adheres to the leather;

(b) applying to the leather which has received the undercoat an intermediate coat in the form of a liquid mixture containing polyurethane at a greater concentration than the undercoat, which adheres to the undercoat;

(c) applying to the leather which has received the undercoat and the intermediate coat a finishing layer in the form of a polyurethane solution, which adheres to the intermediate coat.

21. A method of manufacturing footwear, comprising the steps of:

(a) applying to leather an undercoat in the form of a diluted aqueous emulsion of polyurethane, which adheres to the leather;

(b) applying to the leather which has received the undercoat an intermediate coat in the form of a liquid mixture containing polyurethane at a greater concentration than the undercoat, which adheres to the undercoat;

(c) applying to the leather which has received the undercoat and the intermediate coat a finishing layer in the form of a polyurethane solution, which adheres to the intermediate coat;

(d) forming the leather thus treated into a footwear upper; and (e) fixing a sole to the upper and adhering it to the finishing layer.

22. A method according to claim 21, wherein at least one of the undercoat, the intermediate coat and the finishing layer contains pigments.

23. A method according to claim 21, wherein at least one of the undercoat, the intermediate coat and the finishing layer contains a reticulating agent.

24. A method according to claim 21 wherein, prior to step (a), the leather is retanned using only synthetic chemicals.

25. A method according to claim 24, wherein the retanning chemical are chosen from the group comprising anionic and sulfonated condensed phenol derivatives, phosphonic esters and polyglycol esters.

26. A method according to claim 24, wherein hydrogen chemical bonds are formed between the polyurethane of the undercoat and functional groups of the retanning material, thus increasing the adhesion of the undercoat to the retanned leather.

27. A method according to claim 21, wherein the intermediate coat is in the form of an aqueous emulsion.

28. A method according to claim 21, wherein the application of at least one of the intermediate coat and the finishing layer is followed by glazing.

29. A method according to claim 28, characterized in that said glazing is hot glazing.

30. A method according to claim 28 wherein the application of the finishing layer is followed by glazing and graining.

31. A method according to claim 30, wherein said glazing is hot glazing.

* * * * *